Oct. 30, 1951 J. W. FRENCH ET AL 2,572,919
VIBRATION DAMPING MOUNTING FOR OPTICAL OBSERVATION INSTRUMENTS
Filed Feb. 28, 1946 3 Sheets-Sheet 1
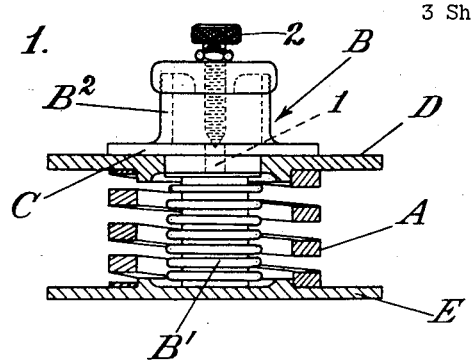
FIG: 1.
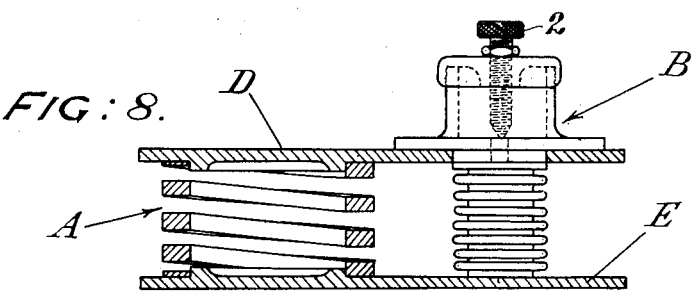
FIG: 8.
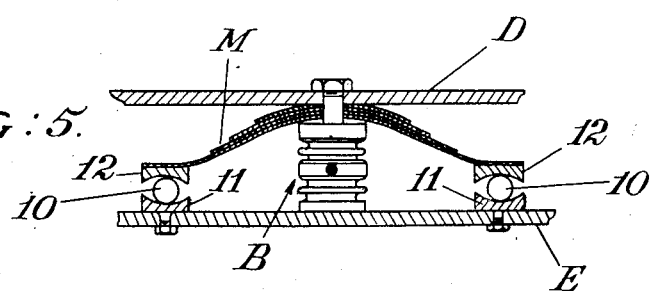
FIG: 5.
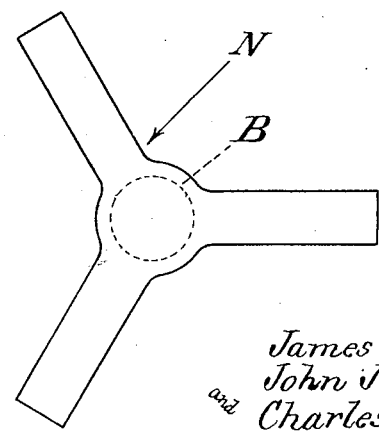
FIG: 6.
Inventors
James W. French
John M. Strang
and Charles D. Macgill
by Hewitt Griggs Robertson
Attorney Oct. 30, 1951   J. W. FRENCH ET AL   2,572,919
VIBRATION DAMPING MOUNTING FOR OPTICAL OBSERVATION INSTRUMENTS
Filed Feb. 28, 1946   3 Sheets-Sheet 2
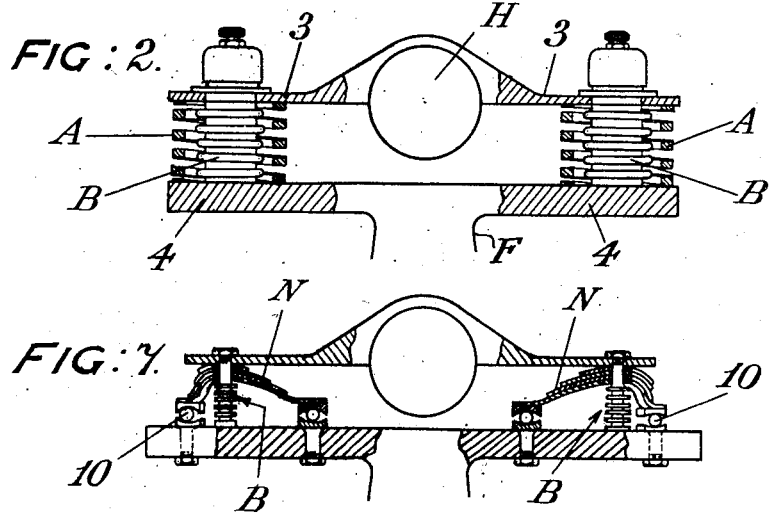
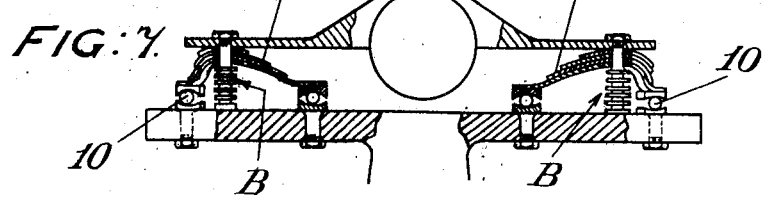
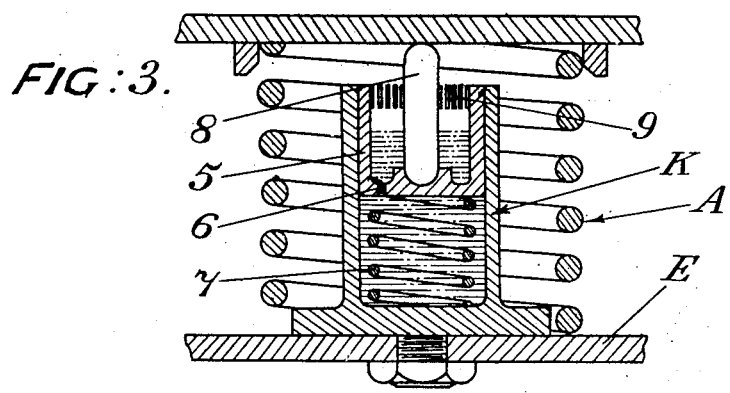
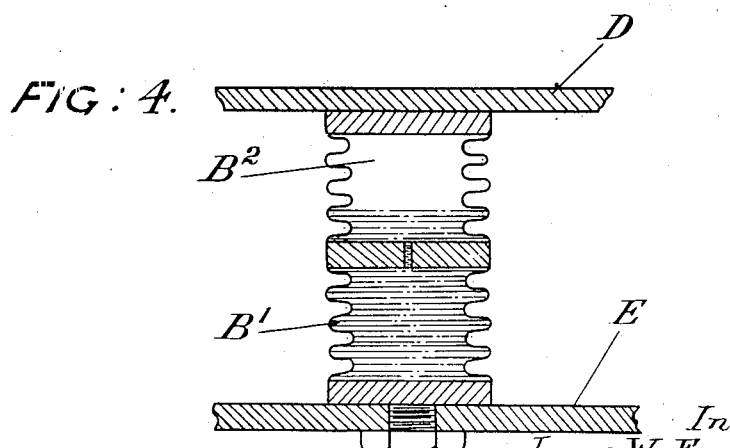
Inventors
James W. French
and John I. Strang
Charles D. Macgill
by Hewitt Griggs Robertson
Attorney Oct. 30, 1951     J. W. FRENCH ET AL     2,572,919
VIBRATION DAMPING MOUNTING FOR OPTICAL OBSERVATION INSTRUMENTS
Filed Feb. 28, 1946     3 Sheets-Sheet 3

Inventors
James W. French
John M. Strang and
Charles H. Macgill
by Hewitt Griggs Robertson
Attorney Patented Oct. 30, 1951

2,572,919

UNITED STATES PATENT OFFICE 2,572,919

VIBRATION DAMPING MOUNTING FOR OPTICAL OBSERVATION INSTRUMENTS

James Weir French, John Martin Strang, and Charles D. Macgill, Glasgow, Scotland, assignors to Barr & Stroud, Limited, Glasgow, Scotland Application February 28, 1946, Serial No. 650,898
In Great Britain April 30, 1943

Section 1, Public Law 690, August 8, 1946
Patent expires April 30, 1963

4 Claims. (Cl. 248—21)

This invention refers to the mounting of optical observation instruments such as rangefinders, the invention being concerned with mountings for the reduction or elimination of vibration, surge and shock that would otherwise be communicated from the support to the instrument particularly on board ship.

For this purpose, mountings embodying self-damping elastic material such as rubber have been used. It may, however, be desirable to avoid the use of rubber or like material, and this raises problems in regard to the damping of vibration.

According to this invention, an optical observation instrument has an anti-vibration mounting comprising a plurality of resilient supporting elements which are not of self-damping nature and which provide support for the instrument at a normally horizontal plane through the centre of gravity of the instrument, and, in association therewith, one or more damping devices of dash-pot character. In particular, the resilient supporting elements may be of metallic spring character. It will be understood that metallic springh are not in themselves self-damping and the function of the dash-pot is to render the mounting self-damping. The position of the centre of gravity relative to the supporting elements is very important.

The construction of the mounting is preferably such as to provide also for lateral yielding of the mounting, i. e. in directions more or less at right angles to the dash-pot axis, to avoid or reduce the transmission of lateral shock to the instrument.

Springs used in the mountings may be of helical type with the axis of the spring coincident or parallel with the axis of the dash-pot, or the springs may be of leaf type. In the first case, the nature of the springs provides a certain amount of lateral yielding, while in the latter case, provision may be made for lateral movement between the spring and the supporting or the supported structure through the medium of anti-friction means.

Some examples of construction will now be described with reference to the accompanying drawings, in which:

Figure 1 is a view, partly in section, showing a first example of mounting,

Figure 2 shows mountings as illustrated in Figure 1 applied to the support of a rangefinder.

Figures 3, 4 and 5 show three other examples,

Figures 6 and 7 show a fifth example,

Figure 8 shows a sixth example, and

Figure 10:
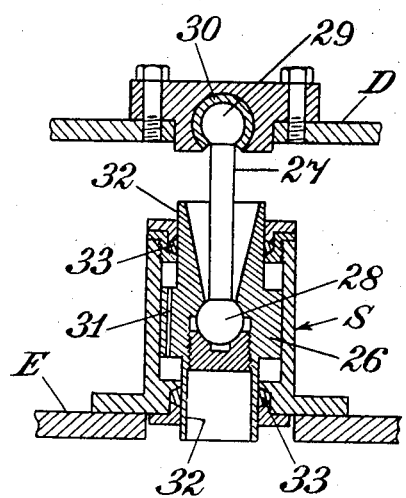
Figures 9, 10, 11 and 12 are sectional views illustrating four further examples.

In the example shown in Figure 1, the mounting component comprises a helical spring A and a vibration damping device B of the distensible and contractible chamber type. The spring is of cross-section determined by the material employed, the permissible maximum deflection, and the weight to be carried. The device B comprises a vibration damping chamber $B^1$ of bellows form and a chamber $B^2$ of rigid construction in communication with one another through a passage I in a partition C, the passage being regulated by a screw valve 2. The chamber $B^1$ is completely filled with liquid but the chamber $B^2$ is not filled, its purpose being to act as a reservoir for the chamber $B^1$. The part denoted D represents part of the structure to be protected from vibration, the partition C of the device B being secured to the part D. Part of the vibrating supporting structure is represented at E. The chamber $B^1$ of the device B is secured to the part E.

The spring A should preferably be of large diameter in relation to its height, say in the ratio of 1 to 1, in order to secure transverse stability, but springs of other proportions may be employed in conjunction with springs in other planes such as the transverse plane to restrict the transverse motion.

Referring to Figure 2, F denotes the pedestal of a rangefinder and H the rangefinder as seen in end elevation. The rangefinder has two pairs of arm 3, the pairs being spaced apart along the rangefinder and only one pair being shown, and the pedestal has two pairs of corresponding arms 4. The rangefinder is thus given four points of support. At each of these, components A, B, as shown in Figure 1, are fitted. The upper surface of the spring A on which the arm 3 rests should be in the plane of the centre of gravity of the instrument to be protected.

Figure 3 shows a modified form. In this case instead of a vibration damping device of the distensible and contractible chamber type, a dash-pot of rigid cylinder type is used. The dash-pot is indicated at K. It is open at the top and has a piston 5 movable within it. The piston has a small aperture 6 for the passage of liquid from one side to the other. At the under side of the piston there is a light spring 7. The piston rod 8 of the dash-pot is made non-rigid, i. e. it can tilt laterally. Its lower end rests in a rounded socket in the piston and its upper end is rounded and bears against the under side of the structure D which is to be supported. A spiral spring 9 is inserted into the piston around the piston rod in order to tend to keep the piston rod centred. Around the dash-pot there is a spring A. In the construction shown in Figure 1, both the spring A and the vibration damping device B can yield laterally, because of their inherent resiliency. In Figure 3, while the dash-pot is rigid the non-rigid piston rod 8 provides corresponding lateral yield. The piston rod 8 simply bears against the structure D, the spring 7 keeping the piston rod against the structure D.

The construction shown in Figure 4 will be readily understood. In this case, both the lower and the upper chambers B¹, B², of the vibration damping device are of bellows construction. The lower chamber B¹ is filled with liquid while the upper chamber B² is not filled. The supported structure rests on the top of the upper chamber. A helical spring, not shown, is placed around the device in Figure 4 in the same way as in Figures 1 and 3.

Figure 5 shows the use of a semi-elliptic leaf spring M. Each arm of the spring rests on the supporting structure E through the medium of a steel ball 10 the supporting structure having a cupped part 11 and the spring having an inverted cupped part 12 to accommodate the ball. The balls provide for lateral yield.

Figure 6 shows a leaf spring N with three radial arms which can be used in substitution of the semi-elliptic spring M shown in Figure 5. Each arm of the spring rests on a ball 10. Figure 7 shows a rangefinder mounting comprising at each of four points of support a dash-pot B and three-armed spring N.

Figure 8 shows an arrangement comprising a dash-pot B and a helical spring A, with the spring not surrounding the dash-pot.

Figure 9:
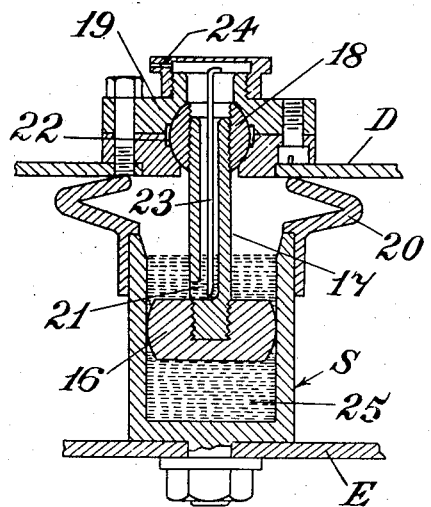

Referring to Figure 9, this shows an open-topped dash-pot cylinder S containing a part-spherical piston 16 from which a piston rod 17 extends upwards. The rod 17 has a ball top 18 engaged in a seating 19 fixed to the structure D. A corrugated oil-proof flexible annular member 20, composed, say, of rubber, is fitted to the top of the cylinder S and bears on the underside of the structure D. An oil vent 21 is provided in the piston rod 17 and an oil depth gauge 23 extends down the vent 21. 24 is an air relief hole. The cylinder contains oil 25 and the piston 16 has appropriate working clearance in the cylinder to suit the viscosity of the oil used, and the damping effect desired. A lubricating oil groove is denoted by 22.

Figure 10 shows an arrangement in which the cylinder S contains a cylindrical piston 26. A piston rod 27 with spherical ends 28 and 29 engages with the piston 26 and with a seating 30 secured to the structure D. A restricted oil passage 31 connects the upper and lower surfaces of the piston. The piston has downward and upward extensions 32 passing through glands 33 in the bottom and top of the cylinder S so that the resistance to downward and upward movement of the piston is the same.

Figure 11:
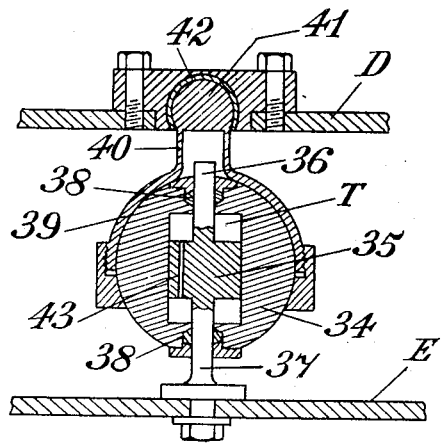

Figure 11 shows an arrangement in which a cylindrical space T is formed within a ball 34, the cylindrical space T containing a cylindrical piston 35 with upward and downward piston rods 36 and 37 each of which passes out of the ball 34 through the medium of a gland 38, the rod 37 being anchored to the supporting structure E. A hemi-spherical cover 39 embraces the upper part of the ball and is secured thereon. The cover 39 has an upward extension 40 with a part-spherical top 41 engaged with a corresponding seating 42 associated with the structure D. In the piston 35 there is a restricted oil passage 43.

Figure 12:
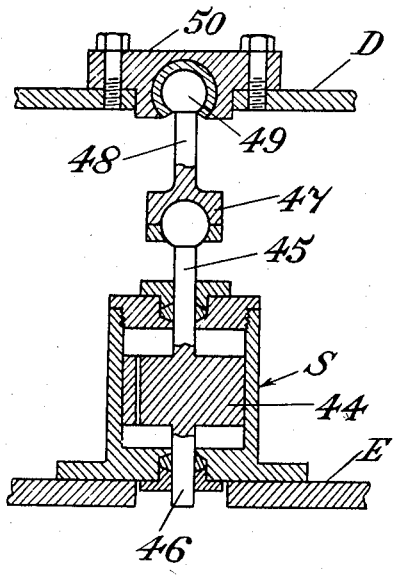

Figure 12 shows another construction in which the cylinder S contains a piston 44 having upper and lower piston rods 45 and 46 passing out of the cylinder through stuffing boxes. The upper piston rod 45 has a universal connection 47 with a connecting rod 48 which has a universal ball joint 49 connecting it to a seating 50 associated with the structure D.

It will be understood that all the constructions described with reference to Figures 9 to 12 are intended to be used with springs as in the previous figures, and further that, with regard to the drawings, only Figures 2 and 7 indicate a complete anti-vibration mounting according to the invention, the remaining figures showing only components of the mounting. The components illustrated are intended for use in mountings built up on the lines of Figures 2 and 7 and comprising in all cases a plurality of resilient supporting elements. The constructions shown in Figures 10, 11 and 12 have the advantage that the oil cylinder is totally closed so that loss of oil is reduced to a minimum.

We claim:

1. In combination, an optical observation instrument, a pedestal therefor, an anti-vibration mounting interposed between said pedestal and the instrument and comprising a series of helical springs which provide support for the instrument, and a corresponding series of dash-pot devices also interposed between said pedestal and the instrument to damp out vibration of said springs, each spring surrounding a dash-pot device, and each spring and dash-pot device supporting the instrument at the normally horizontal plane which passes through the centre of gravity of the instrument, and each dash-pot device including a cylinder mounted on the pedestal, a piston movable in said cylinder, and a piston rod which interconnects the instrument and piston, said piston rod being capable of inclination from the direction of movement of the piston in the cylinder so as to permit lateral yielding of the instrument relative to the pedestal.

2. In combination, an optical observation instrument, a pedestal therefor, an anti-vibration mounting supporting the instrument above the pedestal and comprising a series of helical springs and a corresponding series of dash-pot devices to damp out vibration of said springs, spaced arms extending laterally from the instrument in the normally horizontal plane which passes throught he centre of gravity of the instrument, and corresponding arms on the pedestal, each spring being mounted on an arm of the pedestal and extending upwards to engage the corresponding arm of the instrument at said plane, and each dash-pot device including a cylinder mounted on an arm of the pedestal, a piston movable against the action of a spring located therein, and a piston rod, a rounded socket in the piston in which the lower end of the piston rod rests, the upper end of said rod being rounded and bearing against the underside of an arm of the instrument, so that said rod can tilt laterally of said piston to provide for lateral yielding of the instrument relative to the pedestal.

3. In combination, an optical observation instrument, a supporting structure therefor, an anti-vibration mounting interposed between said supporting structure and the instrument and comprising a series of spring supporting elements which provide support for the instrument, and a corresponding series of dash-pot devices also interposed between said supporting structure and the instrument to damp out vibration of said spring elements, each spring supporting element and each dash-pot device supporting the instrument at the normally horizontal plane which passes through the centre of gravity of the instrument, each spring supporting element being capable of lateral yielding, and each dash-pot device having a cylinder, a piston therein, and a piston rod interconnecting the piston and instrument and being connected to the latter by means including a ball and socket joint located in said plane which passes through the centre of gravity of the instrument so that the instrument is capable of lateral yielding relative to the supporting structure.

4. In combination, an optical observation instrument, a pedestal therefor, an anti-vibration mounting interposed between said pedestal and the instrument and comprising a series of leaf springs which provide support for the instrument and which have at least two arms which rest on ball bearings provided in cupped parts of the pedestal, and a corresponding series of dash-pot devices also interposed between said pedestal and the instrument to damp out vibration of said springs, each spring supporting element and each dash-pot device supporting the instrument at the normally horizontal plane which passes through the centre of gravity of the instrument, and each dash-pot device and spring being capable of lateral yielding to provide for lateral yielding of the instrument relative to the pedestal.

JAMES WEIR FRENCH.
J. MARTIN STRANG.
CHAS. D. MACGILL.

REFERENCES CITED

The following references are of record in the file of this patent:

UNITED STATES PATENTS

| Number | Name | Date |
| --- | --- | --- |
| 1,683,351 | Herr | Sept. 4, 1928 |
| 2,044,649 | Swennes et al. | June 16, 1936 |
| 2,211,416 | Goldsmith | Aug. 13, 1940 |
| 2,387,066 | Harding | Oct. 16, 1945 |

FOREIGN PATENTS

| Number | Country | Date |
| --- | --- | --- |
| 228,023 | Great Britain | Jan. 29, 1925 |
| 502,535 | Great Britain | Mar. 16, 1939 |
| 44,271 | France | Apr. 16, 1932 |